C. J. EASTMAN.
CABLE TRACTION APPARATUS.
APPLICATION FILED JULY 31, 1909.

938,655.

Patented Nov. 2, 1909.
7 SHEETS—SHEET 1.

C. J. EASTMAN.
CABLE TRACTION APPARATUS.
APPLICATION FILED JULY 31, 1909.

938,655.

Patented Nov. 2, 1909.
7 SHEETS—SHEET 3.

UNITED STATES PATENT OFFICE.

CLYDE J. EASTMAN, OF LOS ANGELES, CALIFORNIA.

CABLE TRACTION APPARATUS.

938,655.  Specification of Letters Patent.  Patented Nov. 2, 1909.

Application filed July 31, 1909. Serial No. 510,647.

*To all whom it may concern:*

Be it known that I, CLYDE J. EASTMAN, a citizen of the United States, and a resident of Los Angeles, in the county of Los Angeles and State of California, have invented certain new and useful Improvements in Cable Traction Apparatus, of which the following is a full, clear, and exact specification.

My invention is concerned with cable traction apparatus of the type shown in my Patents No. 681,632, granted August 27, 1901, and No. 900,060, granted September 29, 1908, which apparatus is adapted for field use in various agricultural operations, and in which the ability to utilize fully all the power of an engine to produce traction with a minimum of weight in the traction apparatus and of wear in its use is the great desideratum.

In both of my aforesaid prior patents, the apparatus is arranged so that the power of the engine must be applied either to the cable or to the ground traction wheels, but could not be applied to both simultaneously, the theory of its operation being that the cable traction drive was used during the travel of the apparatus across the field being plowed, while the ground traction drive was used merely in turning the apparatus around at the ends of the field.

In my present invention, I construct the apparatus so that the cable and ground traction drives can be used simultaneously, as is desirable during the travel of the apparatus across the field; or the cable traction can be utilized alone, as is desirable in taking up the slack in the cable, which may accumulate in case the ground traction is better than the average; or the ground traction drive can be utilized alone, as is necessary in turning the apparatus around at the ends of the fields.

The great advantage of the simultaneous use of the ground and cable traction drives is that it enables me to utilize the full power of the engine to produce traction with a much smaller, less expensive and more flexible cable, and with less wear on the cable, than is possible where the entire load is thrown on it during the ordinary operation, as is the case with the structures of my prior patents.

Another feature of my invention resides in the novel laying-down mechanism, which permits the joints or splices in the cable to pass through it without the possibility of obstruction.

Another feature of my invention resides in the novel mechanism by which the speed is varied.

Another feature of my invention resides in the novel laying-down mechanism which employs slip-clutch connections to prevent the recoil which would otherwise occur when the drums are released at the end of the field.

Another feature of my invention resides in the employment of movable posts for the transverse cables in connection with the apparatus at the ends of the field, and in the specific structure of these posts whereby the pull on the cables they support holds them firmly in place.

Other novel features of my invention will be set forth at length in the body of this specification and particularly pointed out in the claims.

To illustrate my invention, I annex hereto seven sheets of drawings, in which the same reference characters are used to designate identical parts in all the figures, of which,—

Referring first to Figs. 1 to 4, the framework 30 of the apparatus is here represented diagrammatically as mounted on the traction wheels 31 and the steering wheels 32, these parts generally constituting the running gears of the apparatus. Mounted upon the framework 30, are a pair of grooved drums 33 and 34 about which the main section 35 of the cable is adapted to be wound during the passage of the machine from one end of the field to near the other end of the field. At each end of the field, I preferably employ detachable cable sections 36 which are of sufficient length so that they will pass through the machine and leave their halves of the coupling 37 projecting therefrom, when the machine is at the extreme end of the field, as indicated in the dotted line position shown in Fig. 1.

Figures 1, 3:
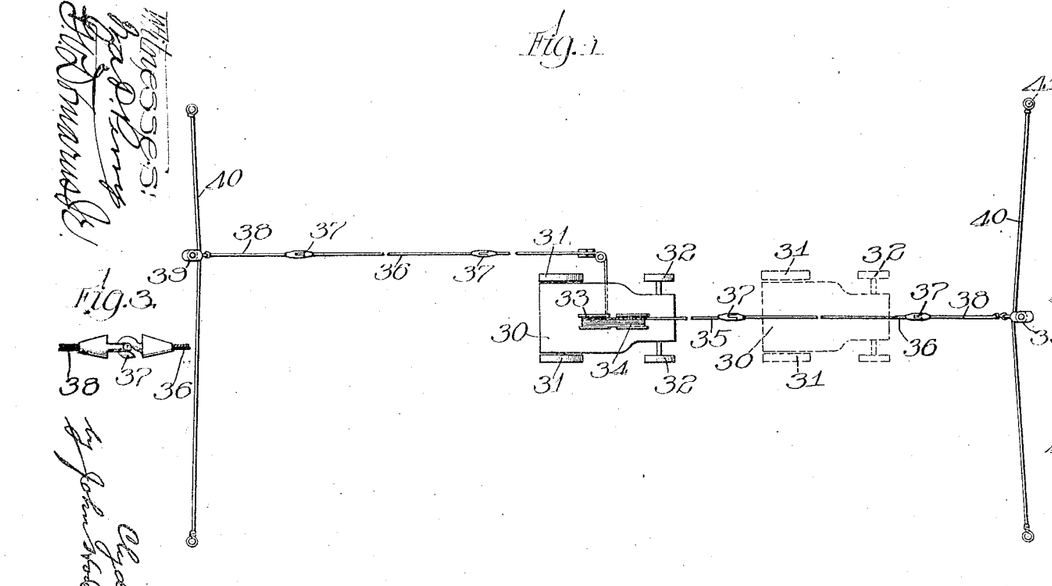
Figures 1 and 2 are diagrammatic top plan and side elevation views, respectively, illustrating the various cables and their connections which I preferably employ in utilizing my invention.
Fig. 3 is a detail illustrating a form of coupling which may be employed to connect the different sections of the cable.
Figure 2:
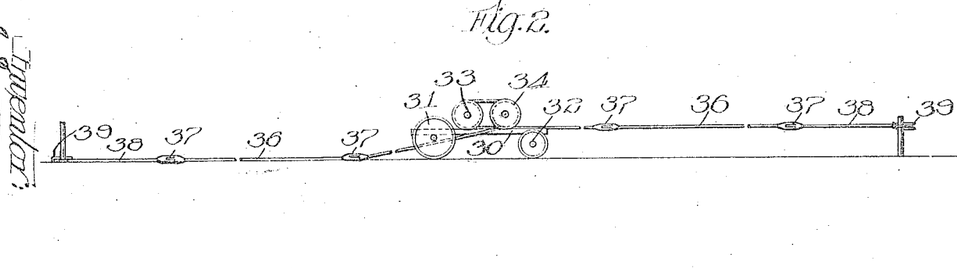
Figure 4:
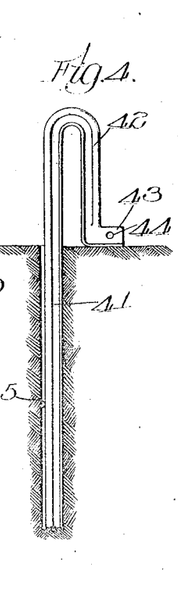
Fig. 4 is a side elevation illustrating a removable post in the ground, showing how the same is adapted to be held in a vertical position in the hole.

In order to give the necessary play to the ends of the cable on account of the necessary distance between the path of the apparatus going in one direction and returning, I preferably employ very short connections 38, which are likewise detachably coupled to the sections 36, and have at their ends the sheaves 39 which run over the transverse cables 40. These transverse cables 40 are preferably secured to posts 41, such as are shown in Fig. 4, which are preferably made up of heavy iron rods or bars, and consist of the main portion, which is preferably about nine feet long, and the offset portion 42, which is preferably about three feet long, and is provided preferably with the shoe portion 43 having the aperture 44 therein, through which a hook attached to the cable 40 is passed. The holes 45 are dug in the ground at suitable distances apart, preferably about six feet in depth, and when any particular portion of the field is to be plowed, etc., the posts 41 are dropped into the proper holes 45 and the cables 36, 38 and 40 assembled as shown. The employment of a post of this particular form prevents the pull of the cable from pulling the post out of the ground, as the shoe 43 to which the cable is applied rests on the surface of the ground, and as a result the pull is transmitted to the side of the hole 45, so that there is no tendency to pull the post out of the hole, as would be the case if the post did not have the loop portion extending above the top of the ground.

It will be understood that the running gears 30 carry an engine which can be used to drive the traction wheels 31, or the drums 33 and 34, or both, and it will likewise be understood that during the normal operation in passing from one end of the main cable section 35 to the other end, the engine is coupled to both the traction wheels 31 and the drums 33 and 34, so that the power of the engine exerted through the traction wheels tends to drive the apparatus forward along the line of the cable, and this ground traction pull is of course supplemented by the pull of the drums 33 and 34 on the cable 35 as it passes through the machine. When the end of the field is reached and the engine has run off of the central cable section 35 onto one of the end sections 36, as shown in dotted lines in Fig. 1, the two couplings 37 at either end of the engine are released, and the engine is then turned around by the power applied to the traction wheels 31, and the cable section 36 coupled up on the sections 35 and 38 with its ends reversed, and the apparatus is then driven to the other end of the field, the movement of the sheaves 39 on the cables 40 permitting the necessary lateral displacement of the cable 36.

Having now described the general structure and operation of the apparatus, I will describe the details of the traction apparatus by which the foregoing method of operation can be carried out.

Figure 5:
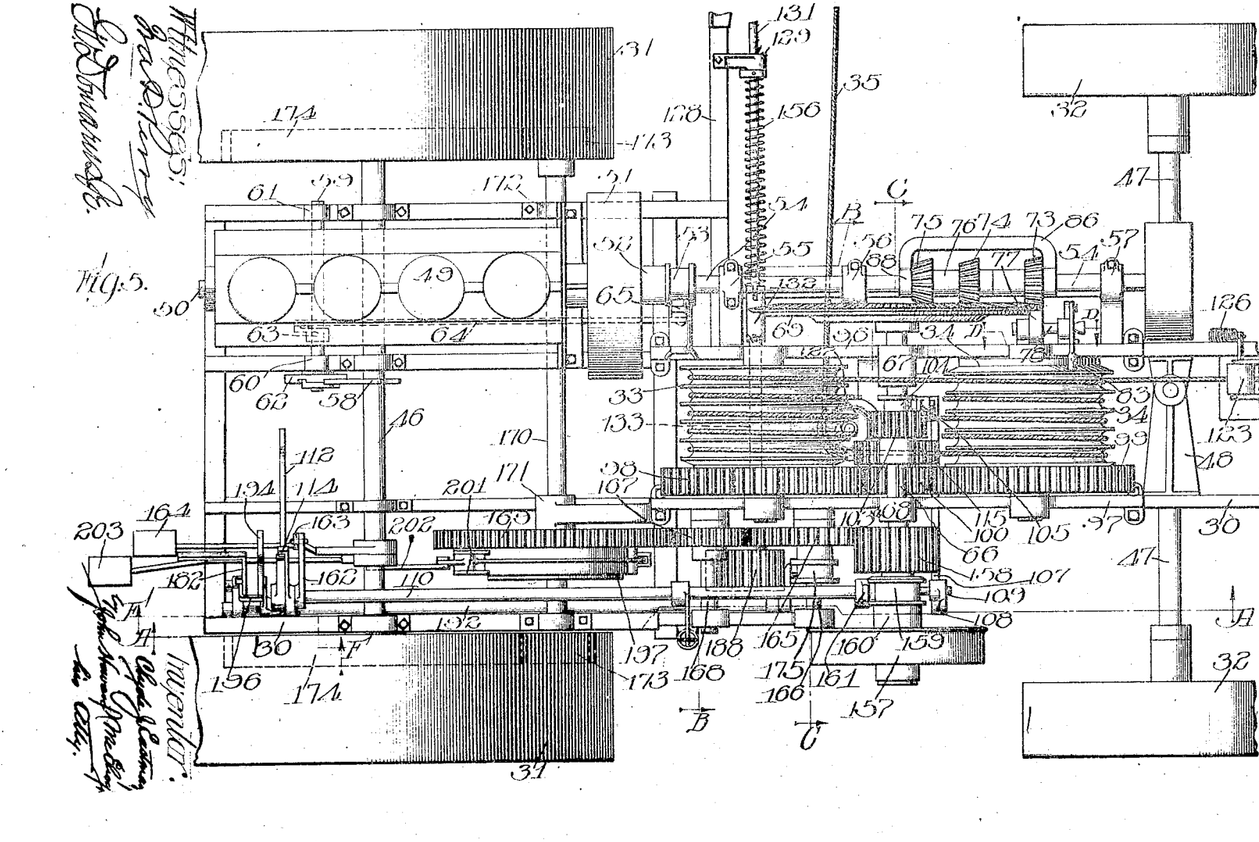
Fig. 5 is a top plan view of the apparatus, a portion of the cable receiving and laying-down mechanisms being broken away to get the drawing in the limits of the sheet.
Figure 6:
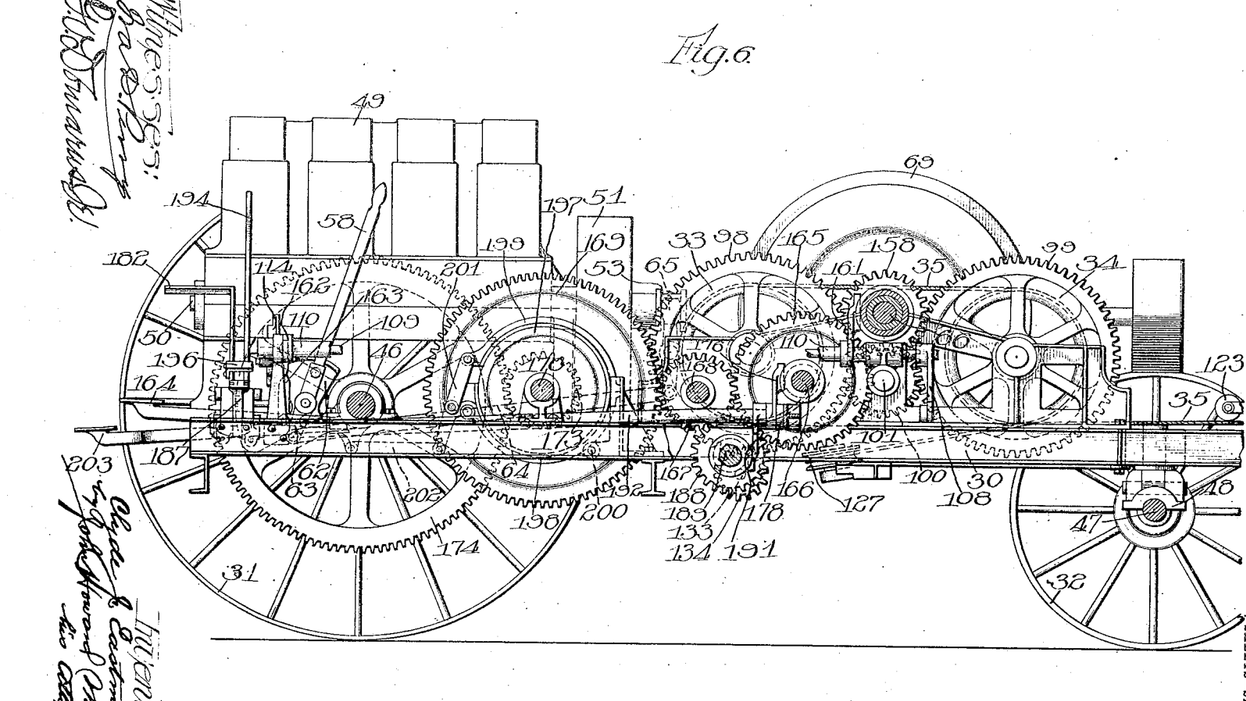
Fig. 6 is a side elevation of the same, in section on the line A—A of the Fig. 5.

As seen in Figs. 5 and 6, the framework 30 is of the necessary construction to support the various parts upon the ground or traction wheels 31 and the steering wheels 32. The traction wheels 31 are journaled on the ends of the stationary axle 46, and the steering wheels 32 are journaled on the ends of the axle 47, which is preferably journaled in suitable bearings 48 at its center mounted on the customary vertical swivel, so that the wheels can be turned in the manner customary with traction engines, by any suitable steering mechanism (not shown), although of course it will be understood that I may, if preferred, employ a stationary axle 46 and swivel the journals of the steering wheels 32 on the ends of the stationary axle, as is the custom in automobile practice.

The motor 49, which is preferably a gas engine of any desired construction and power, is suitably supported on the framework, and its shaft 50 has on one end thereof the combined fly wheel and clutch member 51, and coöperating with the member 51, secured to the shaft 50, is the movable member 52 of the clutch mechanism, which has the clutch annulus 53 splined on the shaft 54 journaled in suitable bearings 55, 56 and 57. A hand lever 58 is secured on the end of the rock shaft 59 journaled in bearings 60 and 61, and this lever 58 coöperates with a locking segment 62 in the customary manner to secure the clutch in its operative and non-operative positions. A crank arm 63 secured on the shaft 59 is connected by a link 64 with the lower end of the shifting lever 65, suitably pivoted on the framework and having its upper end provided with the customary fork coöperating with the annulus 53, so that the engine can be coupled to or uncoupled from the shaft 54 as the operation of the apparatus may demand.

A transverse driving shaft 66, through which the power of the engine applied to the shaft 54 may be transmitted to the drums 33 and 34 or to the traction wheels 31, or to both, is journaled in suitable bearings 67 and 68 supported by the framework, and I preferably make the connections between the shafts 54 and 66 such as will permit of a variation in the speed at which the apparatus is driven, and for this purpose I preferably employ the mechanism best shown in Figs. 5 to 11, where it will be seen that the shaft 66, which can be moved longitudinally in its bearings a short distance, has rigidly secured on the adjacent end thereof the bevel gear wheel 69, which has three concentric rows of teeth 70, 71 and 72, which are adapted to coöperate, one set at a time, with their respective bevel gear pinions 73, 74 and 75, preferably rigidly secured together and forming an elongated sleeve 76, which is splined on the shaft 54. The shaft 66 is normally held in position so that the proper set of teeth on the bevel gear wheel 69 will be held in engagement with the proper bevel pinion by means of a roller 77, best shown in Fig. 9, which is preferably rigidly secured on the shaft 78, which is journaled in bearings 79 and 80 formed on the bracket 81. The shaft 78 has its end 82 reduced as shown, so as to form an annular shoulder with which the latch 83 pivoted at 84 to an arm projecting from the bearing 79 engages to hold the shaft 78 from longitudinal movement when the disk 77 is in engagement with the rear side of the bevel gear wheel 69, it being understood that the latch 83 has the U-shaped recess 85 formed therein to engage the shoulder on the shaft 78. When the speed is to be changed, the latch 83 is lifted and the shaft 78 moved outward, carrying with it the disk 77 until it is out of the plane of the bevel gear wheel 69, after which the latter and its shaft 66 are shifted sufficiently to disengage the bevel pinion from the teeth of the bevel gear wheel.

Figure 7:
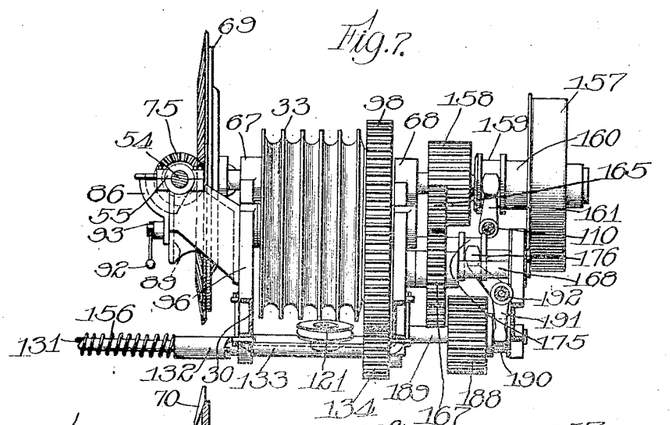
Fig. 7 is a vertical section on the line B—B of Fig. 5.
Figures 8, 9, 10:
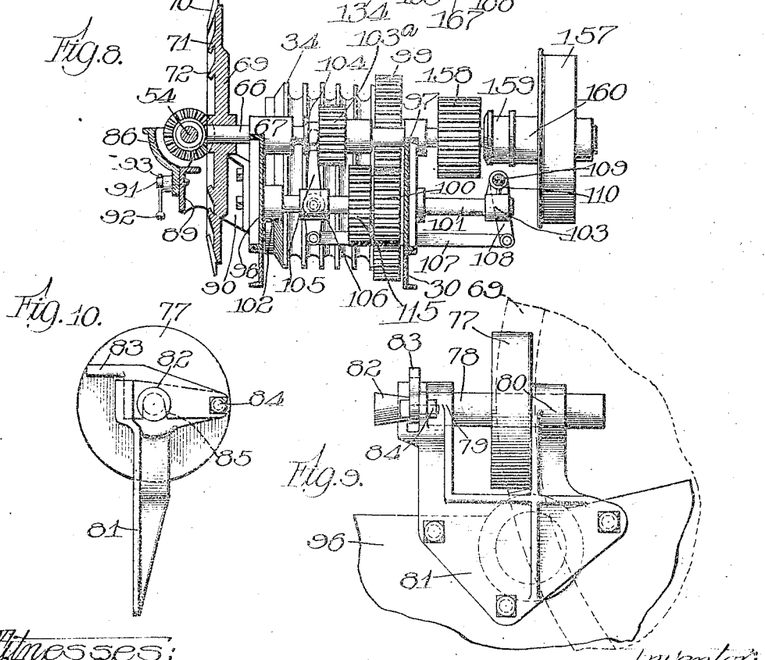
Fig. 8 is a similar view in section on the line C—C of the same figure.
Fig. 9 is a detail substantially in section on the line D—D of Fig. 5.
Fig. 10 is an end elevation of a portion of the mechanism shown in Fig. 9.
Figure 11:
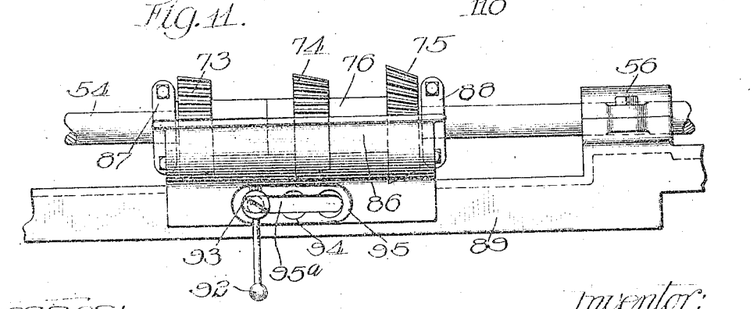
Fig. 11 is a detail of the bevel pinions of the speed-changing mechanism appearing at the left in Figs. 7 and 8.

As best shown in Figs. 7, 8 and 11, the sleeve 77, with its attached pinions 73, 74 and 75 have their position on the shaft 54 determined by the frame 86, which has bearing arms 87 and 88 through which the shaft 54 passes. The framework has a bar 89 formed on the bracket 90, and this bar is adapted to have screwed therein the set screw 91, which preferably has the handle 92 extending from the head 93 of the screw, which head is adapted to enter into one of the three recesses 94 formed in the boss 95 of the frame 86, the three recesses 94 being connected by the slot 95ª through which the body of the screw 91 passes, so that by turning the screw 91, the frame 86 can be released and slid along to the necessary position to bring the desired bevel pinion in engagement with the desired set of teeth, after which it is tightened up and its head enters the proper recess 94 to secure the parts in the desired engagement, after which the bevel wheel 69 is moved up into mesh and the shaft 78 and the wheel 77 secured in their engaging position.

The winding drums 33 and 34 are secured on shafts journaled in suitable bearings carried by longitudinal castings 96 and 97, and rigidly secured directly to the drums, or to the shafts to which they are in turn secured, are the spur gear wheels 98 and 99, which are driven by the spur gear pinion 100, which is journaled on the shaft 101, best shown in Fig. 8, which is supported in bearings 102 and 103. The shaft 66 has splined thereon between the bearings 67 and 68, the spur gear pinion 103ª, which has secured thereto the grooved clutch ring 104, with which coöperates the upper end of the clutch shifting lever 105, which is pivoted on a suitable bearing 106 supported by the shaft 101, and has its lower end connected by a link 107 with the arm 108 secured on the end of a rock shaft or rod 109, which is journaled in the hollow rock shaft or tube 110, which is journaled in suitable bearings and extends to the rear of the machine, where the rock shaft 109 has secured to its outer end the lever socket 111, in which is pivoted the drum clutch operating lever 112 which is normally held in engagement with one of the two recesses 113 formed in the coöperating segment 114 suitably supported from the framework. By shifting the lever 112 from one position to the other, the gear 103ª may be shifted longitudinally of the shaft 66 to bring it into or out of engagement with the gear pinion 115, which is rigidly secured to the gear pinion 100, and thus the drums 33 and 34 may be thrown into or out of operation, as desired, without stopping the rotation of the shaft 66.

Figures 12, 13, 14:
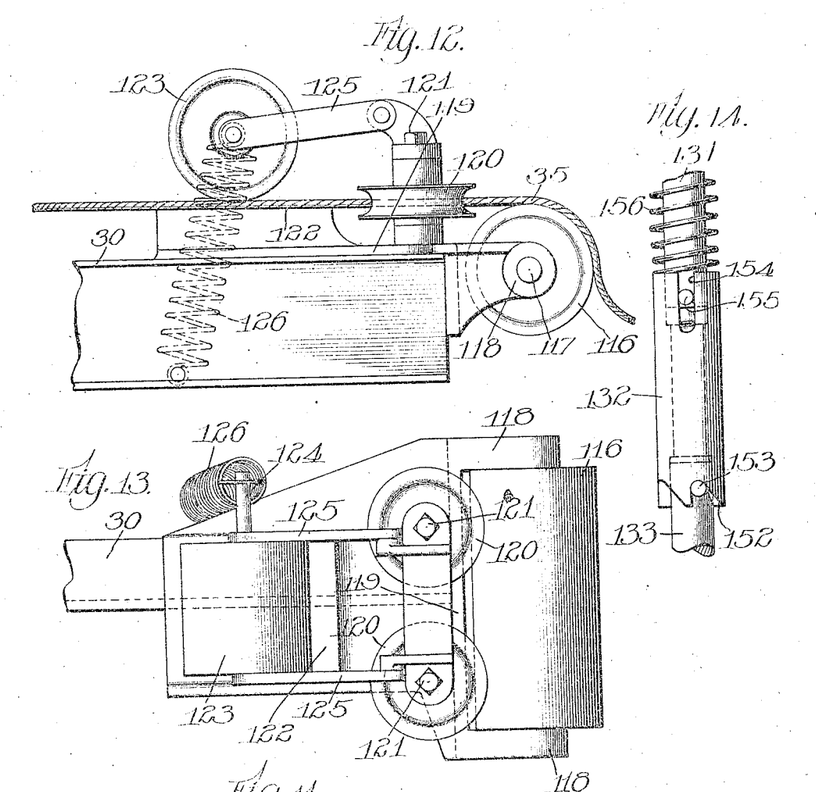
Figs. 12 and 13 are enlarged side-elevation and top-plan views, respectively, of the cable-receiving mechanism.
Fig. 14 is a detail of the shaft connections of the cable laying-down mechanism.
Figures 15, 16, 18:
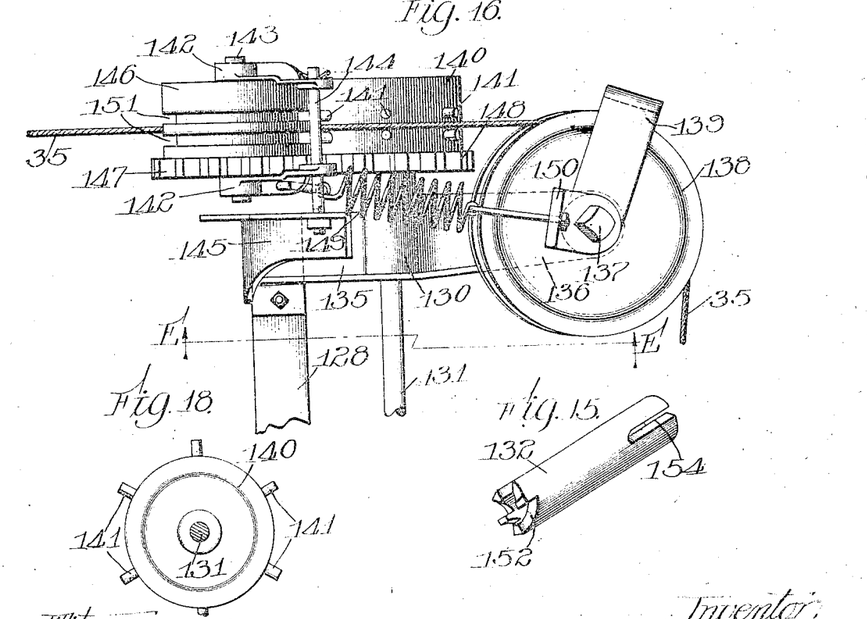
Fig. 15 is a perspective view of the clutch sleeve shown in Fig. 14.
Fig. 16 is a top plan view of the cable laying-down mechanism on an enlarged scale, showing the portion broken off in Fig. 5.
Fig. 18 is a side elevation of the toothed feed-wheel of the cable laying-down mechanism.
Figure 17:
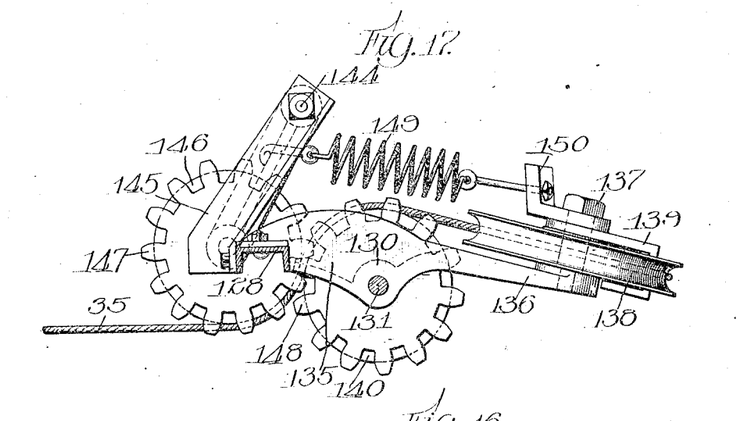
Fig. 17 is a side elevation of the same, with the frame in section as on the line E—E of Fig. 16.

The cable 35 is drawn over the roller 116, best shown in Figs. 12 and 13, which is journaled on or secured to the shaft 117, which may be secured or journaled in bearings 118 formed on the casting 119 secured to the front end of the framework. The cable passing over the roller 116 passes between guide sheaves 120, which are suitably journaled upon vertical bearing studs 121 suitably supported from the casting 119, and it passes over the tension surface 122, forming a part of the casting 119, with which it is held in engagement by the spring-pressed tension roller 123 which is journaled on the shaft 124 carried by the arms 125 pivotally supported from the casting 119. A strong helically-coiled contractile-spring 126 has one end secured to the shaft 124 and the other end to the framework, so that the roller 123 is always held down upon the cable 35 with sufficient pressure to hold it taut as it passes beneath the drum 34 and to the drum 33, around which it passes, thence to the drum 34, and so on until it passes around all the grooves in the two drums and is led off of the last groove of the drum 34, over the guiding sheave 127, which is suitably supported from the framework, and directs the cable to the laying-down mechanism, which is best shown in Figs. 16 to 18, and its driving connections in Figs. 5, 14 and 15.

A bar 128 extends from the frame out in front of the traction wheel 31 on the left-hand side, and has secured thereto bearings 129 and 130, in which is journaled a shaft 131, which is coupled in the manner to be described by the sleeve 132 with the shaft 133 journaled in suitable bearings and having its inner end extending beneath the gear wheel 98 with which the spur gear pinion 134 carried by the end of said shaft engages. The bracket 135, of which the bearing 130 forms a part, has the arm 136 which carries the stub shaft 137, upon which the guiding sheave 138 is journaled, and this sheave is preferably provided with the yoke 139 to keep the cable 35 in engagement therewith. The cable, after passing around the sheave 138, passes over the driving roller 140, which is secured on the outer end of the shaft 131 and is provided with pairs of radially projecting pins 141 between which the cable 35 normally passes. A pair of arms 142, in which a shaft 143 is fixed or journaled, are suspended from the rod 144 supported from the bracket 145, and a driving roller 146 coöperating with the roller 140 is secured to or journaled on the shaft 143, and is provided with the spur gear pinion 147 meshing with a corresponding pinion 148 secured on the wheel 140, so that the two wheels 140 and 146, which are of the same diameter, are driven in unison. The wheel 146 is of course free to swing away from the wheel 140, but is held in engagement therewith (except as prevented by the cable 35 passing between them) by the helically-coiled contractile spring 149 secured at one end to the bracket 150 supported from the shaft 137, and at the other end to one of the arms 142. The wheel 146 has the pair of annular grooves 151 therein, with which the pins 141 coöperate, and it will be understood that the purpose of employing these pins and coöperating grooves in this laying-down mechanism is to permit the passage of the joints or connections 37 in the cable without any possibility of their clogging. When one of the joints reaches the laying-down mechanism, the pins 141 engage the joint and force it between the wheels, the wheel 146, of course, swinging out as much as may be necessary to permit the passage of the joint, after which it is brought back into its normal position by the action of the spring 149.

The tension of the receiving rollers and of the laying-down rollers serves to keep the cable taut as it passes around the drums 33 and 34, and it will be understood that the resistance of the loops of the cable, which is wire, in being bent to conform to the curvature of the drums, puts the cable under a very considerable tension, which must be reduced at the end of the field, before the cable sections can be uncoupled, and when this tension is released, the reaction of the cables on the drums tends to rotate them in the opposite direction from their normal winding movement. To permit this reversal of the movement of the drums without reversing the rotation of the wheels 140 and 146, and to hold the tension of the cable between the drums and these wheels, I provide slip clutch connections between the shafts 131 and 133, and for this purpose employ the connections best illustrated in Figs. 14 and 15, where it will be seen that the sleeve 132 is provided with ratchet-shaped teeth 152 which coöperate with the pin or pins 153 projecting radially from the shaft 133. The other end of the sleeve 132 has one or more grooves 154 therein, with which coöperate a corresponding number of pins 155 projecting radially from the shaft 131, and a helically-coiled expanding-spring 156 surrounds the shaft 131 between the end of the sleeve 154 and the bearing 129, so that the sleeve 132 is normally held with its teeth 152 in operative engagement with the pin or pins 153. When the direction of rotation of the shaft 133 is reversed, as will be the case when the drums are released from the driving mechanism and the reaction of the taut loops of the cable on the drums occurs, the pins 153 acting against the inclined sides of the teeth 152 will cam the sleeves 132 outward against the pressure of the springs 156, and thus allow the shaft 133 to rotate without affecting the shaft 131.

Figures 19, 20, 20A, 21:
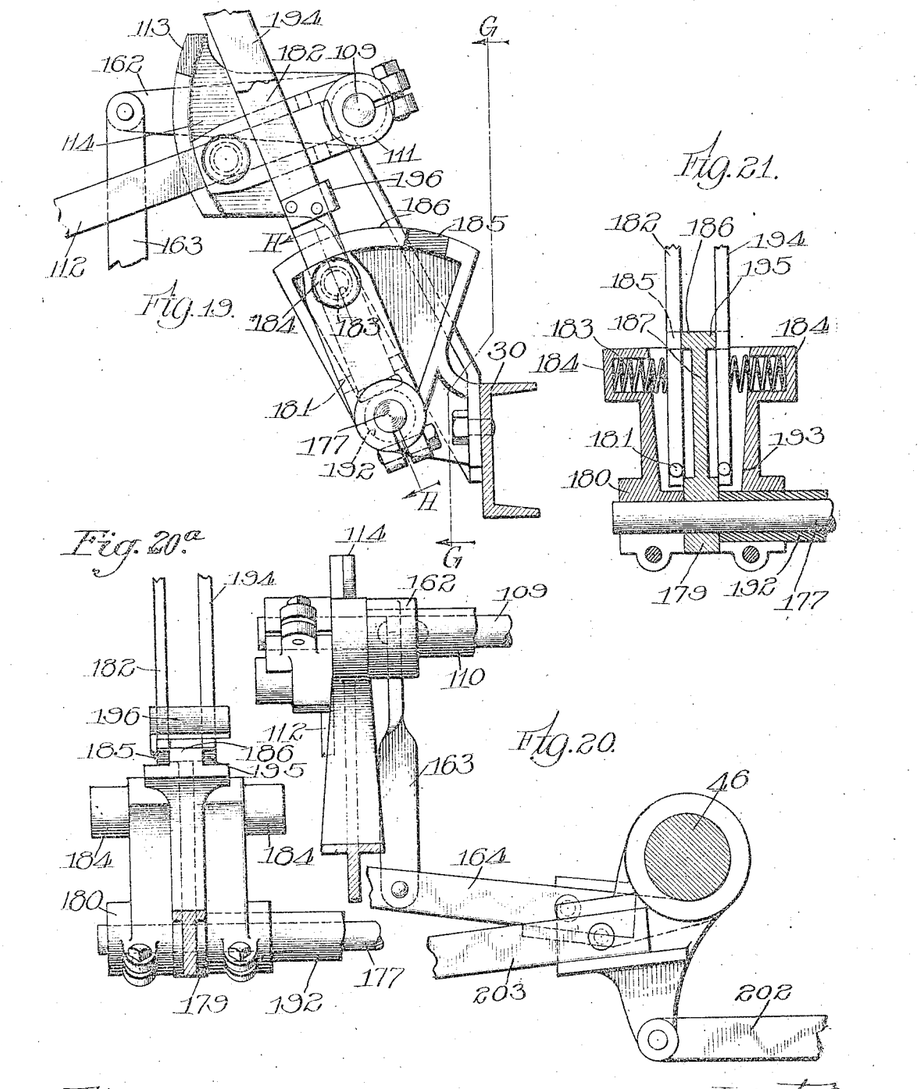
Fig. 19 is an enlarged detail of the mechanism shown in Fig. 20, as seen from the left-hand side thereof.
Figs. 20 and 20ª together constitute an enlarged detail substantially in section on the lines F—F of Fig. 5 and G—G of Fig. 19.
Fig. 21 is a section upon the line H—H of Fig. 19.

The shaft 66 has rigidly fastened on its outer end the clutch member 157, and loosely mounted adjacent thereto is the slightly elongated gear pinion 158, which is rigidly connected to the grooved clutch ring 159 and the movable clutch member coöperating with the stationary member 157, so that by shifting the position of the gear 158 longitudinally of the shaft 66, it can be coupled thereto and uncoupled therefrom. The grooved clutch ring 159 has coöperating therewith the clutch shifting arm 161, which is rigidly secured on the hollow shaft or sleeve 110, which I have previously described as extending to the rear of the machine and furnishing a bearing for the rock shaft 109. At its rear end, as seen in Figs. 5, 19 and 20, the sleeve 110 has secured thereto the arm 162, which has its outer end connected by the link 163 with a foot lever 164 fulcrumed on the axle 46 and extending to the rear of the machine, where it is convenient to the driver. The gear wheel 158 when clutched on the shaft 66 drives the gear wheel 165, which is slidingly mounted on the shaft 166, and meshes with the pinion 167 journaled on the shaft 168 suitably supported in the framework and meshing with the gear wheel 169, which may be connected in any desired manner to the driving shaft 170 journaled in bearings 171 and 172 on the framework and having secured on its outer ends pinions 173 meshing with gear wheels 174 rigidly secured on the traction wheels 31, so that through the train of gearing described the apparatus will be propelled forward in the direction that the winding of the cable through the drums draws it. The gear wheel 165 has rigidly secured thereto the grooved clutch-shifting ring 175, with which coöperates the shifting lever 176 which is secured on the end of a rock shaft 177, which is journaled at its forward end in the bearing 178 supported by the framework, and extends to the rear of the machine, where it is journaled in the bearing 179 suitably supported. It is provided at its rear end with the arm 180, in which is pivoted by pintles 181 the hand lever 182, which is pressed by the helically-coiled expanding-spring 183 mounted in the socket 184 formed in the arm 180, into one of the two recesses 185 formed in the flange 186 of the segment 187 supported from the bearing 179, so that when the lever 182 is shifted in one position or the other, the wheel 165 is likewise shifted longitudinally of its supporting shaft 166. Beneath the wheels 165 and 167, but properly located to mesh with the teeth of both of these wheels, is a slightly elongated gear pinion 188, which is mounted on the shaft 189 suitably supported in the framework. This gear wheel 188 has rigidly secured thereto a grooved clutch-shifting ring 190, which is engaged by the clutch-shifting arm 191 secured on the sleeve 192, in which the rod 177 is journaled. This sleeve 192 has secured on its rear end an arm 193 corresponding to the arm 180, and, like it, provided with a hand lever 194, similarly spring pressed in engagement with a notched flange 195 opposed to and supported from the same segment as the flange 186. When the lever 194 is shifted, the gear wheel 188 will be moved inward on its shaft, and if the gear wheel 165 is at the same time moved outward, the direction of rotation of the traction wheels will be reversed by reason of the fact that the wheel 188, which normally does not engage either wheel 165 and 167, under the new conditions engages both wheels, which are now disengaged from each other, whereas they are normally directly engaged.

As it is desirable that the lever 182 should not be shifted to operate the reversing mechanism without moving the lever 194, and, conversely, it is desirable that the lever 194 should not be moved in the opposite direction without moving the lever 182, I secure to the lever 182 an arm 196 extending into the plane of the lever 194, so that it is impossible to shift the lever 182 in one direction without shifting the lever 194, and consequently it is impossible to shift the lever 194 without shifting the lever 182.

As the apparatus is perfectly geared up so that the traction drive, if there was no slipping of the traction wheels on the ground, would drive the machine forward about ten per cent. faster than the cable drive, in order to allow for the natural slippage of the traction, it is advisable to provide means for stopping the action of the traction drive in case an unusually good stretch of ground permits the traction to get ahead of the cable and cause the latter to become slack. This is possible by operating the foot lever 164 to disengage the clutch members 157 and 160, when the drive will be on the cables alone, and to at the same time apply brakes to the driving mechanism so as to force the slipping of the traction wheels on the ground and thus take up the slack rapidly, I preferably secure the brake disk 197 on the shaft 170, and about this disk I locate the brake band, made up of the two parts 198 and 199, pivotally connected at 200 and having their other ends connected to the lever 201, the lower end of which is connected by the link 202 with the foot lever 203 journaled on the axle 46, as best shown in Fig. 20. By depressing the foot lever 203, in connection with the operation of the traction clutch lever 164, the ground traction can be stopped and slowed up so that the cable drive is free to take up the slackness in the cable and cause it to once more pull, after which the ground traction is again thrown in operation by operating the necessary levers.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with running gears, and a traction wheel carried thereby, of a driving member journaled therein, and means for rotating said member, cable-gripping drums, and driving connections between said member and traction wheel and drums, whereby the wheel and the drums can each be driven separately or both simultaneously.

2. In a device of the class described, the combination with running gears, and a traction wheel carried thereby, of a driving member journaled therein, and means for rotating said member, cable-gripping drums, a cable running over said drums, means for securing the ends of the cable from longitudinal movement, and driving connections between said member and traction wheel and drums, whereby the wheel and the drums can each be driven separately or both simultaneously.

3. In a device of the class described, the combination with running gears, and a traction wheel carried thereby, of a driving member journaled therein, means for rotating said member, cable-gripping drums, driving connections between said member and traction wheel, including a shiftable clutch, and driving connections between said member and drums, likewise including a shiftable clutch.

4. In a device of the class described, the combination with running gears, and a traction wheel carried thereby, of a driving member journaled therein, means for rotating said member, cable-gripping drums, driving connections between said member and traction wheel, including a shiftable clutch, driving connections between said member and drums, likewise including a shiftable clutch, a cable running over said drums, and means for securing the ends of the cable from longitudinal movement.

5. In a device of the class described, the cobination with running gears, and a traction wheel carried thereby, of an engine on said running gears, a driving member journaled thereon, clutch connections between said engine and member, cable-gripping drums, and driving connections between said member and traction wheel and drums, whereby the wheel and the drums can each be driven separately or both simultaneously.

6. In a device of the class described, the combination with running gears, and a traction wheel carried thereby, of an engine on said running gears, a driving member journaled thereon, clutch connections between said engine and member, cable-gripping drums, a cable running over said drums, means for securing the ends of the cable from longitudinal movement, and driving connections between said member and traction wheel and drums, whereby the wheel and the drums can each be driven separately or both simultaneously.

7. In a device of the class described, the combination with running gears and a traction wheel carried thereby, of an engine on said running gears, a driving member journaled thereon, clutch connections between said engine and member, cable-gripping drums, driving connections between said member and traction wheel, including a shiftable clutch, and driving connections between said member and drums, likewise including a shiftable clutch.

8. In a device of the class described, the combination with running gears, and a traction wheel carried thereby, of an engine on said running gears, a driving member journaled thereon, clutch connections between said engine and member, cable-gripping drums, driving connections between said member and traction wheel, including a shiftable clutch, driving connections between said member and drums, likewise including a shiftable clutch, a cable running over said drums, and means for securing the ends of the cable from longitudinal movement.

9. In a device of the class described, the combination with running gears, and a traction wheel carried thereby, of a driving member journaled therein and means for rotating said member, cable-gripping drums, driving connections between said member and drums, means for engaging and disengaging said connections, driving connections between said member and traction wheel, and means for engaging and disengaging said connections operable independently of the condition of the driving connections between the drums and driving member.

10. In a device of the class described, the combination with running gears and a traction wheel carried thereby, of a driving member journaled therein and means for rotating said member, cable-gripping drums, driving connections between said member and traction wheel, means for engaging and disengaging said connections, driving connections between said member and drums, and means for engaging and disengaging said connections operable independently of the condition of the driving connections between the traction wheel and driving member 11. In a device of the class described, the combination with running gears, and a traction wheel carried thereby, of a driving member journaled therein and means for rotating said member, cable-gripping drums, driving connections between said member and drums, means for engaging and disengaging said connections, driving connections between said member and traction wheel, means for engaging and disengaging said connections operable independently of the condition of the driving connections between the drums and driving member, braking mechanism for the traction wheel, and means for applying said braking mechanism.

12. In a device of the class described, the combination with running gears and a traction wheel carried thereby, of a driving member journaled therein and means for rotating said member, cable-gripping drums, driving connections between said member and traction wheel, means for engaging and disengaging said connections, driving connections between said member and drums, means for engaging and disengaging said connections operable independently of the condition of the driving connections between the traction wheel and driving member, braking mechanism for the traction wheel, and means for applying said braking mechanism.

13. In a device of the class described, the combination with running gears and a traction wheel carried thereby, of a driving member journaled therein and means for rotating said member, cable-gripping drums, driving connections between said member and drums, means for engaging and disengaging said connections, driving connections between said member and traction wheel, means for engaging and disengaging said connections operable independently of the driving connections between the drums and driving member, and means for reversing said driving connections to the traction wheel.

14. In a device of the class described, combination with running gears and a traction wheel carried thereby, of a driving shaft journaled therein and means for rotating said shaft, cable-gripping drums, driving connections between said shaft and drums, comprising gear wheels on said drums, an interposed pinion meshing with said gear wheels, a gear pinion splined on said shaft and movable to bring it into and out of operative engagement with said interposed pinion, driving connections between said shaft and traction wheel, and means for engaging and disengaging said last-mentioned connections.

15. In a device of the class described, the combination with running gears and a traction wheel carried thereby, of a driving member journaled therein, an engine, connections between said engine and driving member for varying the speed of the latter without changing the speed of the engine, cable-gripping drums, driving connections between said member and drums, means for engaging and disengaging said connections, driving connections between said member and traction wheel, and means for engaging and disengaging said last-mentioned connections.

16. In a device of the class described, the combination with running gears and a traction wheel carried thereby, of a driving member journaled therein, an engine, connections between said engine and driving member for varying the speed of the latter without changing the speed of the engine, cable-gripping drums, driving connections between said member and drums, means for engaging and disengaging said connections, driving connections between said member and traction wheel, and means for engaging and disengaging said last-mentioned connections, said speed-varying connections consisting of a bevel gear wheel secured to said driving member having plural concentric sets of teeth, and a shaft driven by the engine carrying a corresponding plurality of bevel pinions adapted to be moved one at a time into engagement with their respective set of teeth.

17. In a device of the class described, the combination with running gears and a traction wheel carried thereby, of a driving member journaled therein, an engine, connections between said engine and driving member for varying the speed of the latter without changing the speed of the engine, cable-gripping drums, driving connections between said member and drums, means for engaging and disengaging said connections, driving connections between said member and traction wheel, and means for engaging and disengaging said last-mentioned connections, said speed-varying connections consisting of a bevel gear wheel secured to said driving member having plural concentric sets of teeth, a shaft driven by the engine carrying a corresponding plurality of bevel pinions adapted to be moved one at a time into engagement with their respective set of teeth, a roller engaging the rear side of the bevel gear wheel, and means for moving the roller into and out of engagement with said wheel.

18. In a device of the class described, the combination with running gears and a traction wheel carried thereby, of a driving member journaled therein, an engine, connections between said engine and driving member for varying the speed of the latter without changing the speed of the engine, cable-gripping drums, driving connections between said member and drums, means for engaging and disengaging said connections, driving connections between said member and traction wheel, and means for engaging and disengaging said last-mentioned connections, said speed-varying connections consisting of a bevel gear wheel secured to said driving member having plural concentric sets of teeth, a shaft driven by the engine carrying a corresponding plurality of bevel pinions adapted to be moved one at a time into engagement with their respective set of teeth, a roller engaging the rear side of the bevel gear wheel, and means for moving the roller into and out of engagement with said wheel, consisting of a shaft upon which it is secured, bearings in which said shaft may be moved longitudinally, and a latch for holding it in operative position.

19. In a device of the class described, the combination with running gears and a traction wheel carried thereby, of a driving member journaled therein and means for rotating said member, cable-gripping drums, driving connections between said member and drums, means for engaging and disengaging said connections, driving connections between said member and traction wheel, means for engaging and disengaging said connections operable independently of the condition of the driving connections between the drums and driving member, and means for reversing said driving connections to the traction wheel, comprising a normally-idle pinion shiftable into mesh, and an intermediate gear shiftable out of its direct drive engagement into engagement with the idle pinion.

20. In a device of the class described, the combination with running gears and a traction wheel carried thereby, of a driving member journaled therein and means for rotating said member, cable-gripping drums, driving connections between said member and drums, means for engaging and disengaging said connections, driving connections between said member and traction wheel, means for engaging and disengaging said connections operable independently of the condition of the driving connections between the drums and driving member, and means for reversing said driving connections to the traction wheel, comprising a normally-idle pinion shiftable into mesh, an intermediate gear shiftable out of its direct drive engagement into engagement with the idle pinion, and means for compelling the movement of the intermediate pinion when the idle pinion is moved.

21. In a device of the class described, the combination with running gears and a traction wheel carried thereby, of a driving member journaled therein and means for rotating said member, cable-gripping drums, driving connections between said member and drums, means for engaging and disengaging said connections, driving connections between said member and traction wheel, means for engaging and disengaging said connections operable independently of the condition of the driving connections between the drums and driving member, and means for reversing said driving connections to the traction wheel, comprising a normally-idle pinion shiftable into mesh, an intermediate gear shiftable out of its direct drive engagement with the idle pinion, and means for compelling the movement of the intermediate pinion when the idle pinion is moved, comprising a lever each for said idle pinion and intermediate gear by which they are shifted, and a lug extending from one lever into the path of the other one.

22. In a device of the class described, the combination with cable-gripping drums, and means for rotating them, of a tension device for the cable, consisting of a plate over which it is drawn, and a spring-pressed roller bearing on the cable above the plate.

23. In a device of the class described, the combination with cable-gripping drums, and means for rotating them, of a tension device for the cable consisting of a plate over which it is drawn, a spring-pressed roller bearing on the cable above the plate, and a pair of guiding sheaves journaled on vertical axes between which the cable passes before reaching the plate.

24. In a device of the class described, the combination with cable-gripping drums, and means for rotating them, of a tension device for the cable consisting of a plate over which it is drawn, a spring-pressed roller bearing on the cable above the plate, a pair of guiding sheaves journaled on vertical axes between which the cable passes before reaching the plate, and a horizontal roller in front of the sheaves.

25. In a device of the class described, the combination with cable-gripping drums, and means for rotating them, of a pair of laying-down rollers between which the cable is fed, and connections from the drums for driving the rollers at the same peripheral velocity as the drums.

26. In a device of the class described, the combination with cable-gripping drums, and means for rotating them, of a pair of laying-down rollers between which the cable is fed, and connections from the drums for driving the rollers at the same peripheral velocity as the drums, said connections operating to drive the laying-down rollers in one direction only.

27. In a device of the class described, the combination with cable-gripping drums, and means for rotating them, of a pair of laying-down rollers between which the cable is fed, and connections from the drums for driving the rollers at the same peripheral velocity as the drums, consisting of a gear wheel on one of the drums, a pinion meshing with said wheel, a shaft carrying said pinion, another shaft upon which one of said rollers is secured, and driving connections between said shafts.

28. In a device of the class described, the combination with cable-gripping drums, and means for rotating them, of a pair of laying-down rollers between which the cable is fed, and connections from the drums for driving the rollers at the same peripheral velocity as the drums, consisting of a gear wheel on one of the drums, a pinion meshing with said wheel, a shaft carrying said pinion, another shaft upon which one of said rollers is secured, and slip-clutch driving connections between said shafts.

29. In a device of the class described, the combination with cable-gripping drums, and means for rotating them, of a pair of laying-down rollers between which the cable is fed, and connections from the drums for driving the rollers at the same peripheral velocity as the drums, consisting of a gear wheel on one of the drums, a pinion meshing with said wheel, a shaft carrying said pinion, another shaft upon which one of said rollers is secured, and slip-clutch driving connections between said shaft, consisting of a sleeve connecting the ends of said shafts and having ratchet teeth in one end and a slot in the other, pins on said shafts engaging the teeth and slot, and a spring pressing the teeth into engagement with the coöperating pin.

30. In a device of the class described, the combination with cable-gripping drums, and means for rotating them, of a pair of laying-down rollers between which the cable is fed, and connections from the drums for driving the rollers at the same peripheral velocity as the drums, consisting of a gear wheel on one of the drums, a pinion meshing with said wheel, a shaft carrying said pinion, another shaft upon which one of said rollers is secured, driving connections between said shafts, and intermeshing gear pinions carried by said rollers 31. In a device of the class described, the combination with cable-gripping drums, and means for rotating them, of a pair of laying-down rollers between which the cable is fed, and connections from the drums for driving the rollers at the same peripheral velocity as the drums, consisting of a gear wheel on one of the drums, a pinion meshing with said wheel, a shaft carrying said pinion, another shaft upon which one of said rollers is secured, driving connections between said shafts, intermeshing gear pinions carried by said rollers, and a spring holding said rollers yieldingly in engagement.

32. In a device of the class described, the combination with cable-gripping drums, and means for rotating them, of a pair of laying-down rollers between which the cable is fed, intermeshing gear pinions rigidly secured to said rollers, and driving connections from the drums for driving the rollers at the same peripheral velocity as the drums.

33. In a device of the class described, the combination with cable-gripping drums, and means for rotating them, of a pair of laying-down rollers between which the cable is fed, intermeshing gear pinions rigidly secured to said rollers, driving connections from the drums for driving the rollers at the same peripheral velocity as the drums, and a spring holding said drums yieldingly in engagement.

34. In a device of the class described, the combination with cable-gripping drums, and means for rotating them, of a pair of laying-down rollers between which the cable is fed, connections from the drums for driving the rollers at the same peripheral velocity as the drums, and two rows of teeth carried by one of said rollers and in the plane of grooves in the other roller to receive the teeth.

35. In a device of the class described, the combination with cable-gripping drums and means for rotating them, of a pair of laying-down rollers between which the cable is fed, one of said rollers being provided with parallel grooves, two rows of teeth carried by the other roller adapted to normally enter said grooves, intermeshing gear pinions secured to said rollers, and connections from the drums for driving the rollers at the same peripheral velocity as the drums.

36. In a device of the class described, the combination with cable-gripping drums and means for rotating them, of a pair of laying-down rollers between which the cable is fed, one of said rollers being provided with parallel grooves, two rows of teeth carried by the other roller adapted to normally enter said grooves, intermeshing gear pinions secured to said rollers, connections from the drums for driving the rollers at the same peripheral velocity as the drums, and a spring holding said rollers yieldingly in engagement.

37. In a device of the class described, the combination with a cable traction engine, of a cable upon which said engine operates, and posts to which the ends of the cable are adapted to be ultimately connected, said posts being adapted to be dropped into holes in the ground and having the loop portion above the point at which the cable is connected.

38. In a device of the class described, the combination with a cable traction engine, of a cable upon which said engine operates, and posts to which the ends of said cables are adapted to be ultimately connected, said posts being adapted to be dropped into holes in the ground and having the loop portion above the point at which the cable is connected and the shoe portion adapted to rest on the surface of the ground.

In witness whereof, I have hereunto set my hand and affixed my seal, this 28th day of July, A. D. 1909.

CLYDE J. EASTMAN. [L. S.]

Witnesses:
T. J. EASTMAN,
WILLIAM J. MEYER.